US012795407B2

(12) United States Patent
Ren et al.

(10) Patent No.: US 12,795,407 B2
(45) Date of Patent: Nov. 10, 2026

(54) MONITORING OF MESSAGES THAT INDICATE SWITCHING BETWEEN MACHINE LEARNING (ML) MODEL GROUPS

(71) Applicant: QUALCOMM Incorporated, San Diego, CA (US)

(72) Inventors: Yuwei Ren, Beijing (CN); June Namgoong, San Diego, CA (US); Huilin Xu, Temecula, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 218 days.

(21) Appl. No.: 18/681,481

(22) PCT Filed: Oct. 6, 2021

(86) PCT No.: PCT/CN2021/122519

§ 371 (c)(1),
(2) Date: Feb. 5, 2024

(87) PCT Pub. No.: WO2023/056580

PCT Pub. Date: Apr. 13, 2023

(65) Prior Publication Data

US 2024/0276250 A1 Aug. 15, 2024

(51) Int. Cl.
*H04W 24/02* (2009.01)
*H04W 36/00* (2009.01)

(52) U.S. Cl.
CPC ....... *H04W 24/02* (2013.01); *H04W 36/0055* (2013.01)

(58) Field of Classification Search
CPC ............ H04W 24/02; H04W 36/0055; H04W 36/0083; H04L 41/0823; H04L 41/0806; H04L 41/145; H04L 41/16
See application file for complete search history.

(56) References Cited

U.S. PATENT DOCUMENTS

2017/0238228 A1 8/2017 Zhang et al.
2020/0374844 A1* 11/2020 Takeda ................ H04L 27/2602
(Continued)

FOREIGN PATENT DOCUMENTS

WO 2020075270 A1 4/2020
WO 2020199121 A1 10/2020
(Continued)

OTHER PUBLICATIONS

Supplementary European Search Report—EP21959679—Search Authority—Munich—May 7, 2025.
(Continued)

*Primary Examiner* — Mewale A Ambaye
(74) *Attorney, Agent, or Firm* — Seyfarth Shaw LLP

(57) ABSTRACT

A method of wireless communication by a user equipment (UE) includes receiving a message configuring multiple machine learning model groups. The method also includes receiving signaling configuring monitoring occasions for an indication to switch between the machine learning model groups and monitoring the occasions in accordance with the signaling. The method further includes switching to one of the machine learning model groups in response to receiving the indication detected during the monitored occasions.

30 Claims, 13 Drawing Sheets

(56) References Cited

U.S. PATENT DOCUMENTS

| | | | | |
|---|---|---|---|---|
| 2022/0342713 | A1* | 10/2022 | Shen | G06F 9/5094 |
| 2025/0350501 | A1* | 11/2025 | Pratik | H04L 25/0224 |
| 2025/0358769 | A1* | 11/2025 | Hirzallah | G06N 3/084 |
| 2025/0380157 | A1* | 12/2025 | Marzban | G06N 3/08 |

FOREIGN PATENT DOCUMENTS

| | | | |
|---|---|---|---|
| WO | 2021063875 | A1 | 4/2021 |
| WO | 2021142609 | A1 | 7/2021 |
| WO | 2021142637 | A1 | 7/2021 |

OTHER PUBLICATIONS

Ericsson: "Adaptation Aspects of NR UE Power Saving", 3GPP Draft, 3GPP TSG-RAN WG1 Meeting #95, R1-1813182, Spokane, USA, Nov. 12-16, 2018, pp. 1-4.

International Search Report and Written Opinion—PCT/CN2021/122519—ISA/EPO—Apr. 25, 2022.

European Search Report—EP26162572—Search Authority—Munich—May 27, 2026.

* cited by examiner

MONITORING OF MESSAGES THAT INDICATE SWITCHING BETWEEN MACHINE LEARNING (ML) MODEL GROUPS

FIELD OF THE DISCLOSURE

The present disclosure relates generally to wireless communications, and more specifically to techniques and apparatuses for reducing monitoring of messages that indicate machine learning (ML) model group switching.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

In aspects of the present disclosure, a method for wireless communication, by a user equipment (UE) includes receiving a message configuring multiple machine learning model groups. The method also includes receiving signaling configuring monitoring occasions for an indication to switch between the machine learning model groups and monitoring the occasions in accordance with the signaling. The method further includes switching to one of the machine learning model groups in response to receiving the indication detected during the monitored occasions.

Other aspects of the present disclosure are directed to an apparatus for wireless communication by a UE. The apparatus includes a memory and at least one processor coupled to the memory and configured to receive a message configuring a group of machine learning model groups. The apparatus is also configured to receive signaling configuring monitoring occasions for an indication to switch between the machine learning model groups and to monitor the occasions in accordance with the signaling. The apparatus is further configured to switch to one of the machine learning model groups in response to receiving the indication detected during the monitored occasions.

In other aspects of the present disclosure, a method of wireless communication, by a base station, is disclosed. The method includes transmitting a message configuring multiple machine learning model groups. The method further includes transmitting signaling configuring monitoring occasions for an indication to switch between the machine learning model groups.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
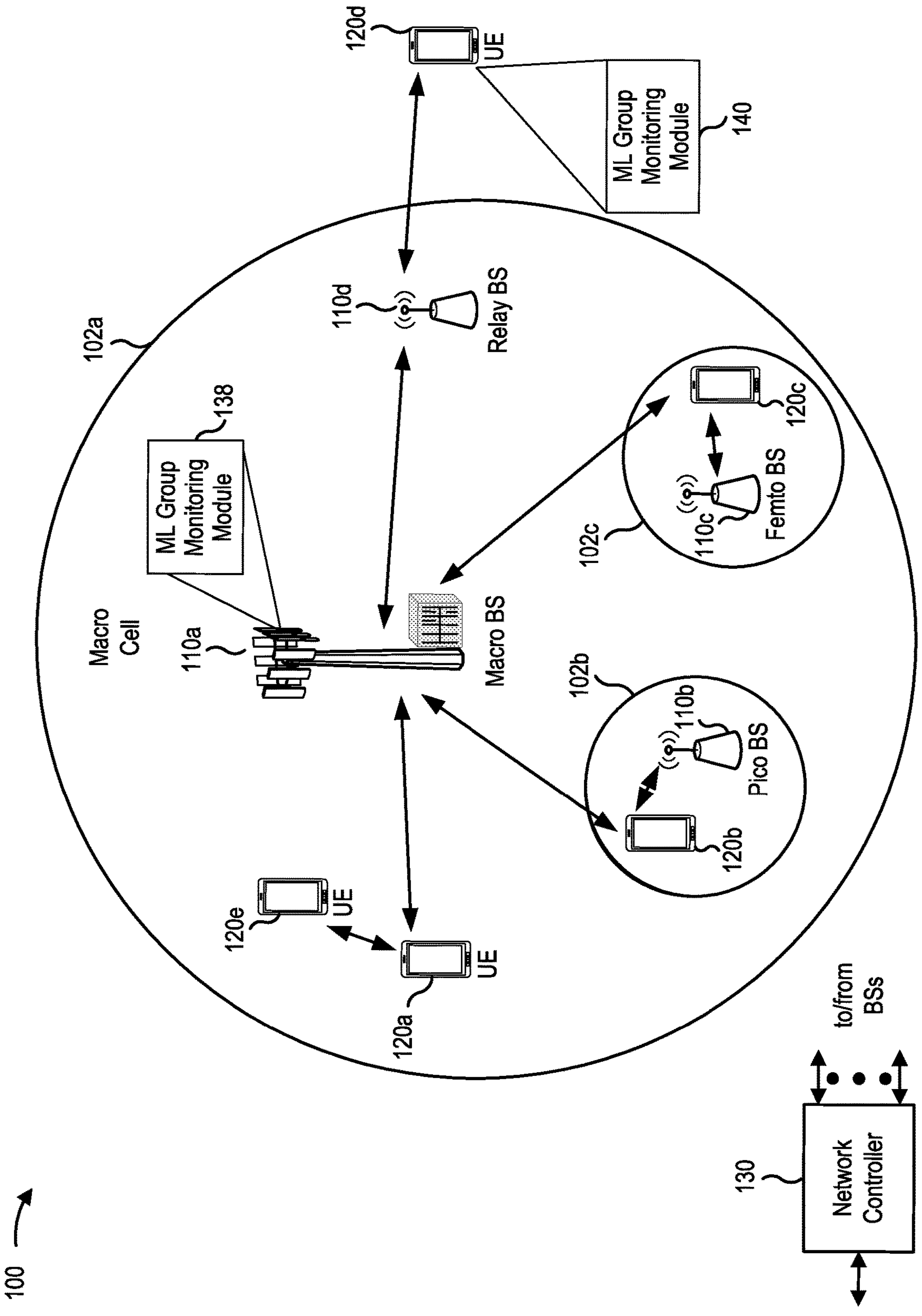
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Machine learning techniques may be employed to improve wireless communications. For example, machine learning may assist with channel state feedback, compression, and other functions involved with wireless communications. A base station may employ machine learning techniques, as may a user equipment (UE).

Multiple machine learning models may be configured and triggered at the UE. The multiple machine learning models may be specified for different application functions. Alternatively, the machine learning models may be different versions for the same application function. The different models may be provided for different generalization capabilities. For example, machine learning models may be UE-specific or cell-specific. The models may have different complexities. For example, some models may be appropriate for a low-tier UE, such as an internet of things (IoT) device, while other models may be well suited for a premium phone or a more powerful device.

Such diverse machine learning models may be categorized into different groups. For example, groups may be based on model complexity with one baseline machine learning group, and one or more advanced machine learning groups. The categorization may be based on a machine learning deployment condition. For example, there may be cell-specific machine learning groups, UE-specific machine learning groups, indoor scenario machine learning groups, outdoor scenario machine learning groups, or other groups. The models may also be grouped based on fallback events (e.g., what occurs upon machine learning failure). These groups may include models that fall back to a machine learning group, models that fall back to a non-machine learning group, models that fall back to normal machine learning groups, and models that fall back to advanced machine learning groups.

During deployment, a UE may need to quickly switch the machine learning groups to adapt to different conditions and specifications. For example, a UE moving from outdoors to inside, such as to a mall, may need to switch to indoor specific models after entering the mall, if the UE is presently executing the outdoor specific machine learning models. In order to achieve fast switching, the machine learning models are categorized into an outdoor group or indoor group, and the UE switches from the outdoor group to the indoor group.

Aspects of the present disclosure relate to reducing monitoring for indications to switch between machine learning model groups. By reducing the monitoring, power savings can be achieved. In some aspects, the network explicitly signals which model groups should be skipped for monitoring. In such aspects, the UE may disable monitoring for model group switching commands associated with the model groups explicitly signaled by the network. Signaling may be configured to deactivate or activate monitoring for one or more model groups. In some aspects, monitoring for some model groups may be disabled for a certain duration.

According to aspects of the present disclosure, signaling for skipping explicit model groups may occur. As a result of the explicit signaling for skipping model groups, unnecessary model group switching actions may be avoided. In some aspects, the activation or deactivation signaling may be embedded within a procedure to access a new cell (e.g., handover event). In other aspects, the activation or deactivation signaling may be embedded with a user equipment mode.

In other aspects of the present disclosure, sparse occasion patterns may be introduced. As described above, the UE may always monitor for model configurations in the configured occasions. If the pattern of monitoring occasions is a dense pattern, the UE consumes a significant amount of power.

As a result of explicit signaling for skipping model groups, unnecessary model group switching actions may be avoided. For example, while a UE is in a cell with low mobility, and/or during the night (while sleeping), most functions are disabled, or discontinuous reception (DRX) is enabled. In this case, except for the base model group, the other model groups may be deactivated for a long duration.

In some aspects, the activation or deactivation signaling may be embedded within a procedure to access a new cell (e.g., handover event). In other aspects, the activation or deactivation signaling may be embedded with a user equipment mode. For example, with a low battery condition, many of the model groups may be disabled. In each of these procedures, there may be explicit signaling indicating which model groups should be activated or deactivated.

In other aspects of the present disclosure, sparse occasion patterns may be introduced. As described above, the UE may always monitor for model configurations in the configured occasions. If the pattern of monitoring occasions is a dense pattern, the UE consumes a significant amount of power.

Different model groups may specify a particular monitoring pattern. In some aspects, separate signaling configures the monitoring pattern. The signaling may be defined in a general machine learning configuration, not associated with any specific models or group. For example, when a UE is synchronized with the machine learning node (e.g., machine learning manager), the monitoring pattern may be configured. The signaling may also be associated with a UE type or working mode.

In other aspects, a specific monitoring pattern is embedded into a model group configuration. In these aspects, a specific monitoring pattern is included in the model group configuration. When switching to one model group, the corresponding monitoring pattern is enabled. In some aspects, when multiple different patterns are simultaneously configured, a densest pattern is enabled. For example, if a UE is configured with multiple model groups simultaneously, each with a different pattern, only the densest pattern is enabled.

In still other aspects, an anchor-based model pattern configuration is used, where one anchor model group set is configured. In these aspects, the set may include multiple model groups. When the UE operates with the anchor model group set, the anchor monitoring pattern is configured. For example, the monitoring pattern for the anchor model group set may be a sparse occasion pattern. When the UE switches to another group, another monitoring pattern is enabled. In some aspects, the anchor model group set is assigned to the group of models the UE operates with most frequently. Thus, the UE does not often need to be configured with a monitoring pattern.

In some aspects of the present disclosure, the monitoring pattern is a subset of a reference pattern configuration. For these subset configurations, a base monitoring pattern is defined. For each pattern configuration, only one subset is configured. For example, the subset configuration may modify the monitoring periodicity (density ratio) and the monitoring starting point.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B, an access point, a transmit and receive point (TRP), and/or the like. Each BS may provide communications coverage for a particular geographic area. In 3GPP, the term “cell” can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms “eNB,” “base station,” “NR BS,” “gNB,” “AP,” “node B,” “5G NB,” “TRP,” and “cell” may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communications between the BS 110*a* and UE 120*d*. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet of things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

The UEs 120 may include a machine learning (ML) group monitoring module 140. For brevity, only one UE 120*d* is shown as including the ML group monitoring module 140. The ML group monitoring module 140 may receive a message configuring multiple machine learning model groups; and receive signaling configuring monitoring occasions for an indication to switch between the machine learning model groups. The ML group monitoring module 140 may also monitor the occasions in accordance with the signaling; and switch to one of the machine learning model groups in response to receiving the indication detected during the monitored occasions.

The base stations 110 may include ML group monitoring module 138. For brevity, only one base station 110*a* is shown as including the ML group monitoring module 138. The ML group monitoring module 138 may transmit a message configuring multiple machine learning model groups; and transmit signaling configuring monitoring occasions for an indication to switch between the machine learning model groups.

As indicated above, FIG. 1 is provided merely as an example. Other examples may differ from what is described with regard to FIG. 1.

Figure 2:
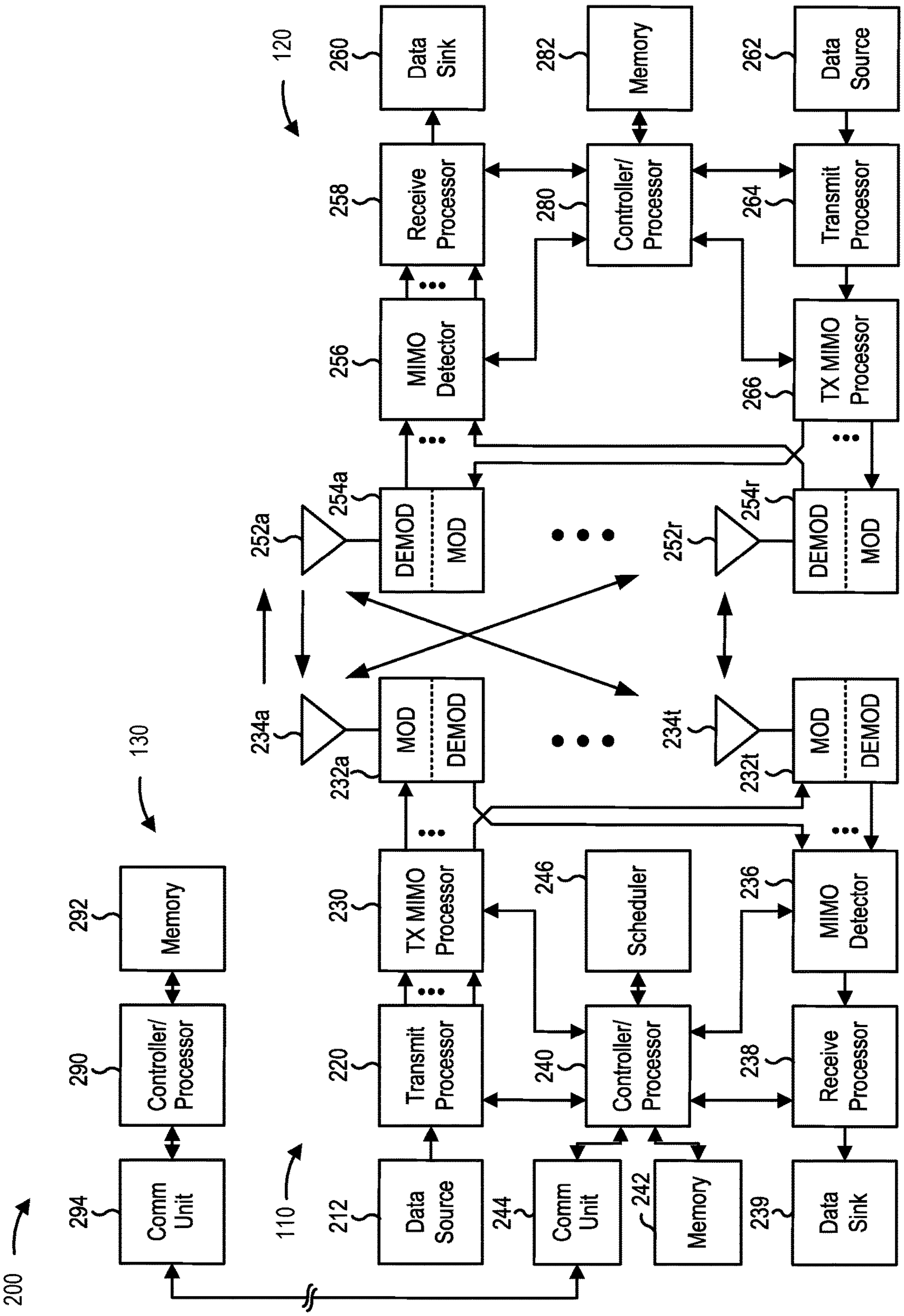
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general $T \geq 1$ and $R \geq 1$.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with monitoring for machine learning model switching commands as described in more detail elsewhere. For example, the controller/processor 240 of the base station 110, the controller/processor 280 of the UE 120, and/or any other component(s) of FIG. 2 may perform or direct operations of, for example, the processes of FIGS. 11 and 12 and/or other processes as described. Memories 242 and 282 may store data and program codes for the base station 110 and UE 120, respectively. A scheduler 246 may schedule UEs for data transmission on the downlink and/or uplink.

In some aspects, the UE 120 and/or base station 110 may include means for receiving, means for monitoring, means for switching, means for selecting, and means for transmitting. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
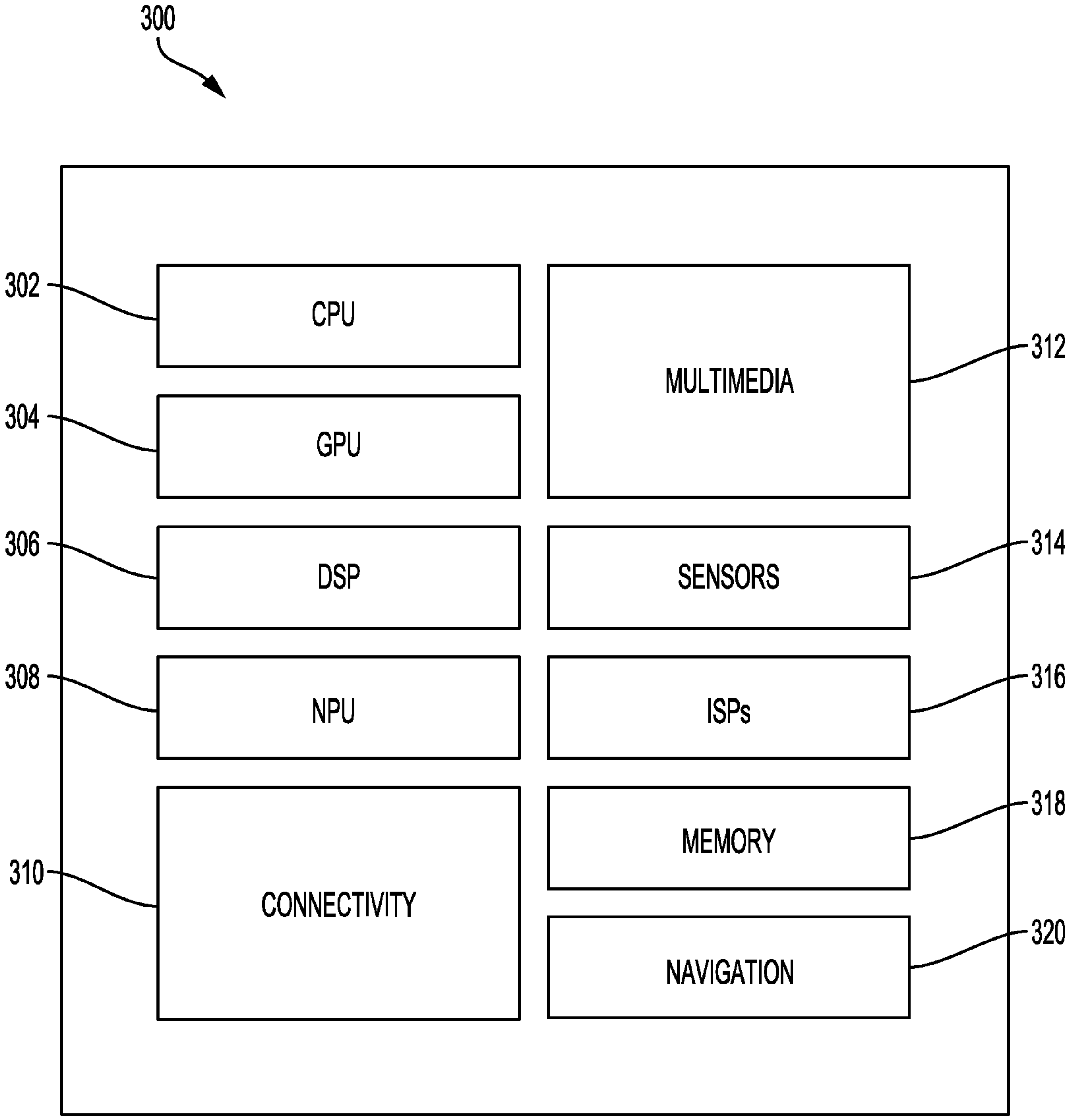
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In aspects of the present disclosure, the instructions loaded into the general-purpose processor 302 may comprise code to receive a message configuring multiple machine learning model groups; code to receive signaling configuring monitoring occasions for an indication to switch between the machine learning model groups; code to monitor the occasions in accordance with the signaling; and code to switch to one of the machine learning model groups in response to receiving the indication detected during the monitored occasions. The instructions may also comprise code to transmit a message configuring multiple machine learning model groups; and code to transmit signaling configuring monitoring occasions for an indication to switch between the machine learning model groups.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer may design, but through training. Furthermore, a deep network may learn to represent and recognize new types of features that a human may not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
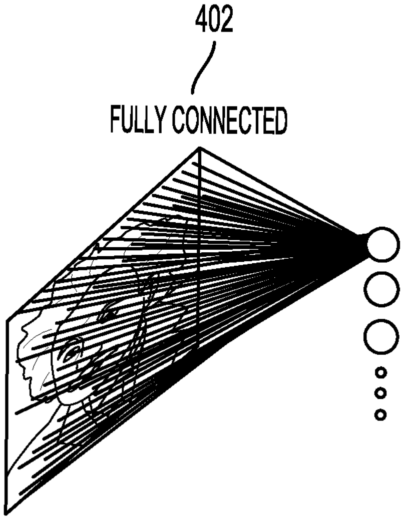
FIGS. 4A, 4B, and 4C are diagrams illustrating a neural network, in accordance with aspects of the present disclosure.
Figure 4B:
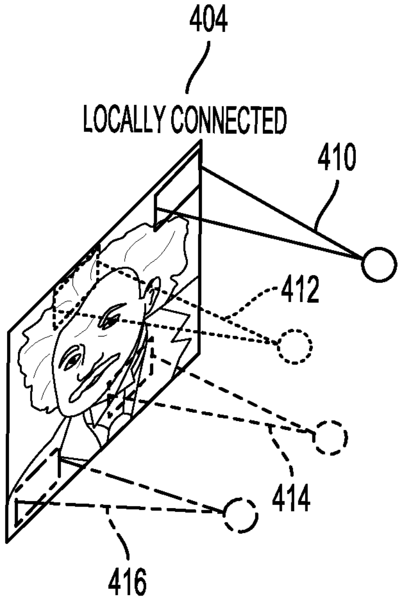

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
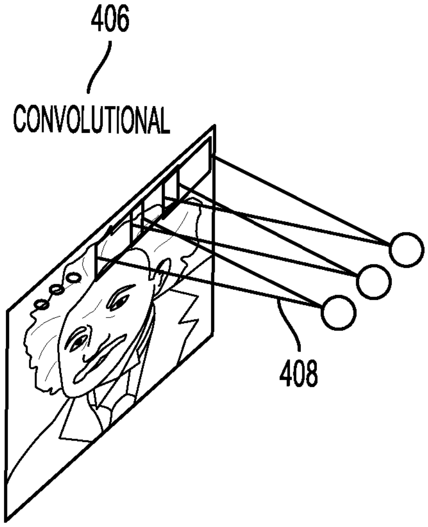

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
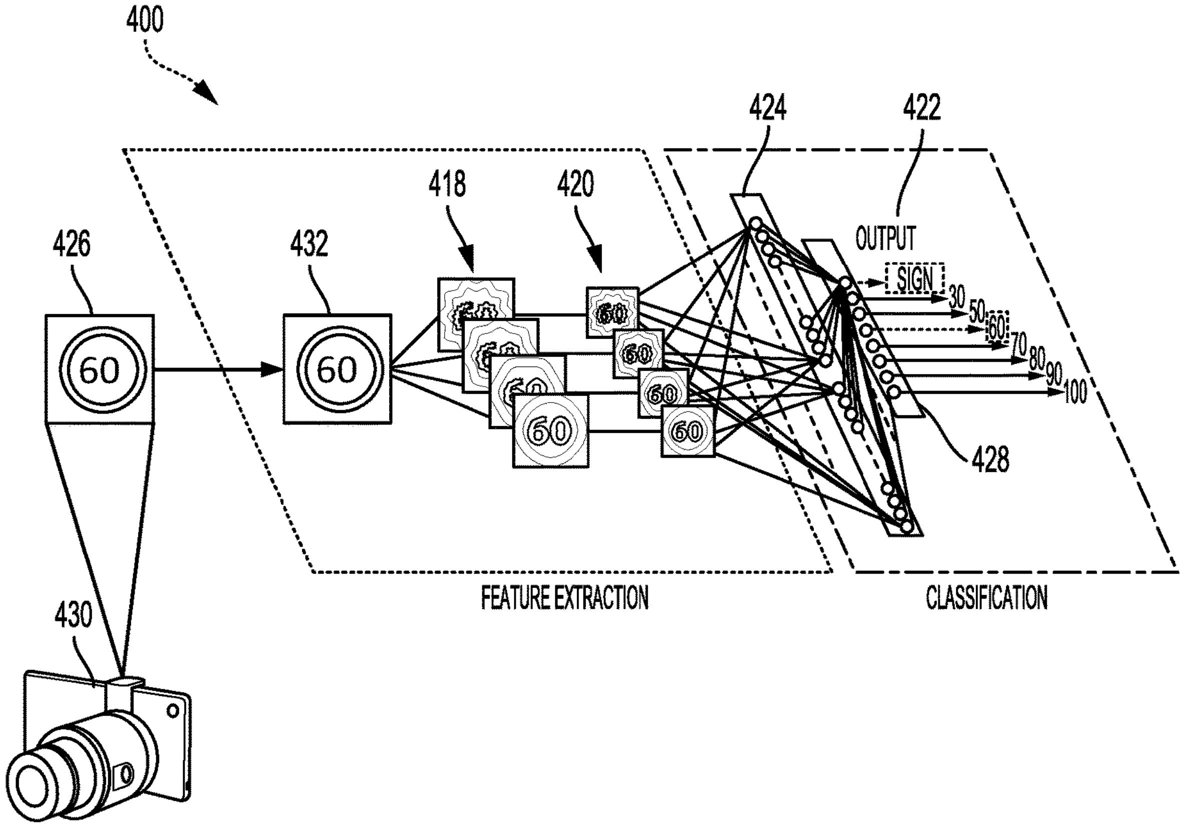
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
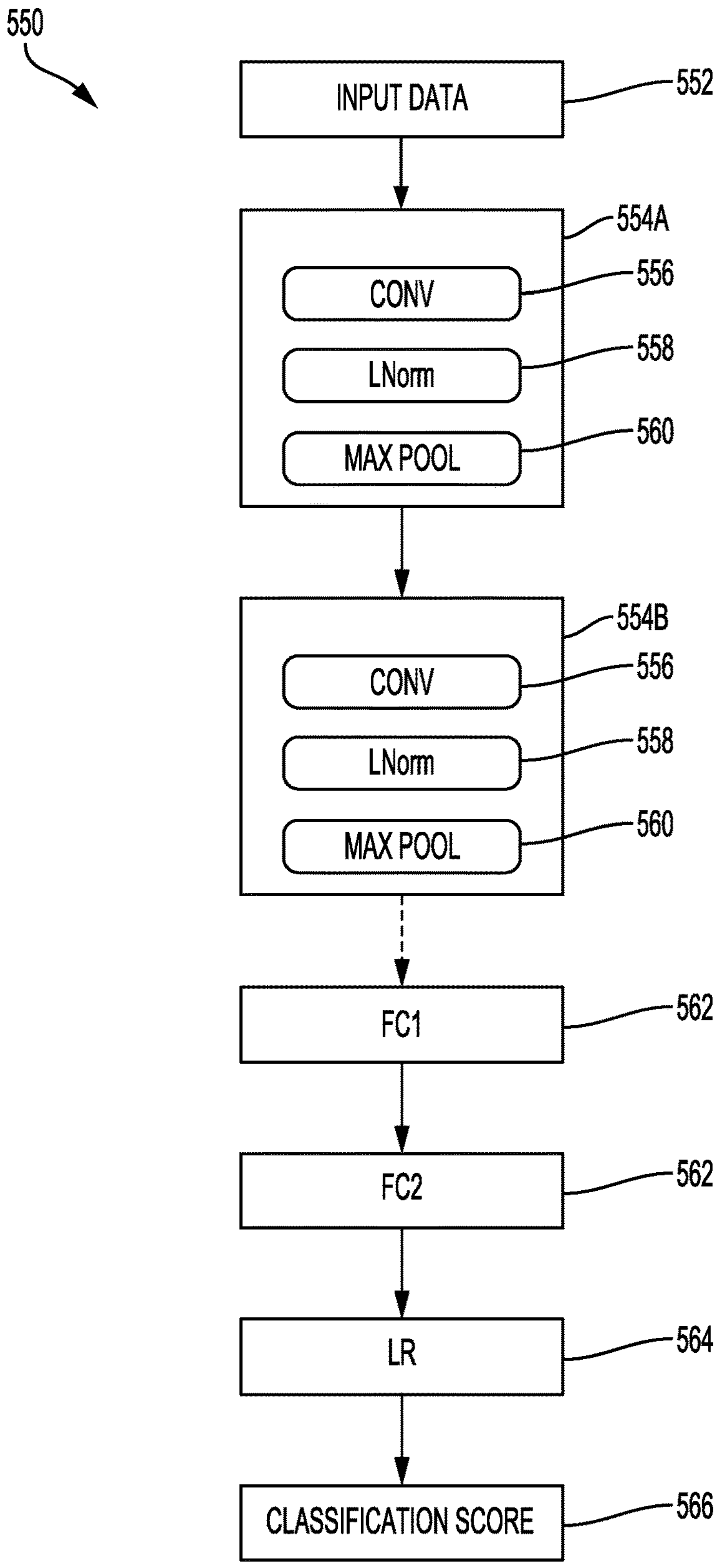
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

Machine learning techniques may be employed to improve wireless communications. For example, machine learning may assist with channel state feedback, compression, and other functions involved with wireless communications. A base station may employ machine learning techniques, as may a user equipment (UE).

Multiple machine learning models may be configured and triggered at the UE. The multiple machine learning models may be specified for different application functions. Alternatively, the machine learning models may be different versions for the same application function. The different models may be provided for different generalization capabilities. For example, machine learning models may be UE-specific or cell-specific. The models may have different complexities. For example, some models may be appropriate for a low-tier UE, such as an internet of things (IoT) device, while other models may be well suited for a premium phone or a more powerful device.

Such diverse machine learning models may be categorized into different groups. For example, groups may be based on model complexity with one baseline machine learning group, and one or more advanced machine learning groups. The categorization may be based on a machine learning deployment condition. For example, there may be cell-specific machine learning groups, UE-specific machine learning groups, indoor scenario machine learning groups, outdoor scenario machine learning groups, or other groups. The models may also be grouped based on fallback events (e.g., what occurs upon machine learning failure). These groups may include models that fall back to a machine learning group, models that fall back to a non-machine learning group, models that fall back to normal machine learning groups, and models that fall back to advanced machine learning groups.

During deployment, a UE may need to quickly switch the machine learning groups to adapt to different conditions and specifications. For example, a UE moving from outdoors to inside, such as to a mall, may need to switch to indoor specific models after entering the mall, if the UE is presently executing the outdoor specific machine learning models. In order to achieve fast switching, the machine learning models are categorized into an outdoor group or indoor group, and the UE switches from the outdoor group to the indoor group. With the groups, the network only needs to trigger the group switching to adapt to different conditions. There may be different grouping rules. Grouping may be based on one rule, or a combination of rules.

It should be noted that each model group may contain a single model as a special case. One group may be mapped to a single machine learning model, where the group switching is equal to a single model configuration. Moreover, each model group may contain multiple models, each for different applications, such as CSI, positioning, etc. Conventional non-machine learning algorithms may be considered as one special model group. If the conventional algorithms are grouped, the model group switching also includes the configuration between conventional algorithms and machine learning models.

Figure 6:
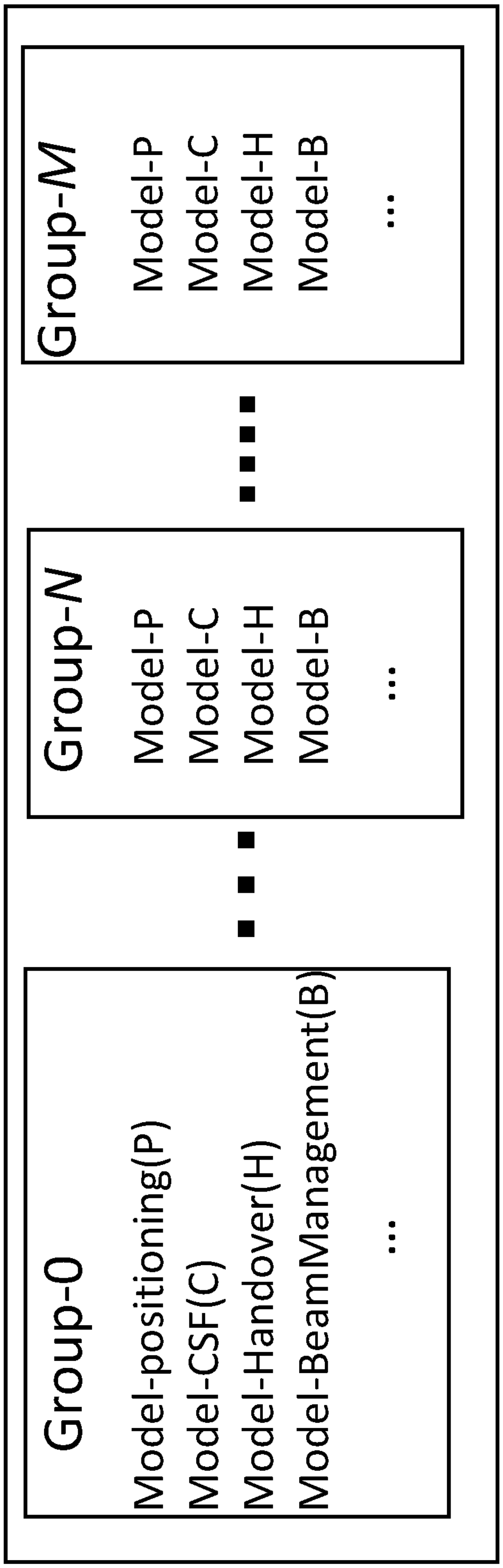
FIG. 6 is a block diagram illustrating model complexity-based grouping, in accordance with various aspects of the present disclosure.

FIG. 6 is a block diagram illustrating model complexity-based grouping, in accordance with various aspects of the present disclosure. In FIG. 6, machine learning models are split into different groups. Each group is mapped to one specific complexity level. Group-O may be a default level, that is, a lowest level with a lowest complexity requirement. The performance from Group-O may be a baseline performance level. Group-N and Group-M are advanced groups, with higher complexity requirements. A low-tier UE may not support the advanced groups, although these groups would provide better performance. As seen in the example of FIG. 6, each group includes at least a model for positioning (Model-P), a model for channel state feedback (CSF) (Model-C), a model for handover (Model-H), and a model for beam management (Model-B). There may be other grouping rules than what is shown in FIG. 6. The grouping may be based on one rule, or a combination of rules.

In the example based on the complexity grouping rules shown in FIG. 6, Group-O may be used in a power saving mode. If the UE is running the models from Group-N, once the UE falls back to power saving mode, the working group would switch to Group-0. Thus, it is not necessary for the UE to update every model to match the power saving mode. Rather, the UE only switches to the corresponding model group. Benefits of model grouping are also seen during model updating. As there are multiple diverse models defined, if every model is updated, model downloading and configuration would lead to greater signaling cost. Thus, updating may be group-based. Machine learning models are data-driven solutions. As such, generally, each specific condition has a corresponding model. As a result, different models optimized for one specific condition, may be categorized as one group.

Figure 7:
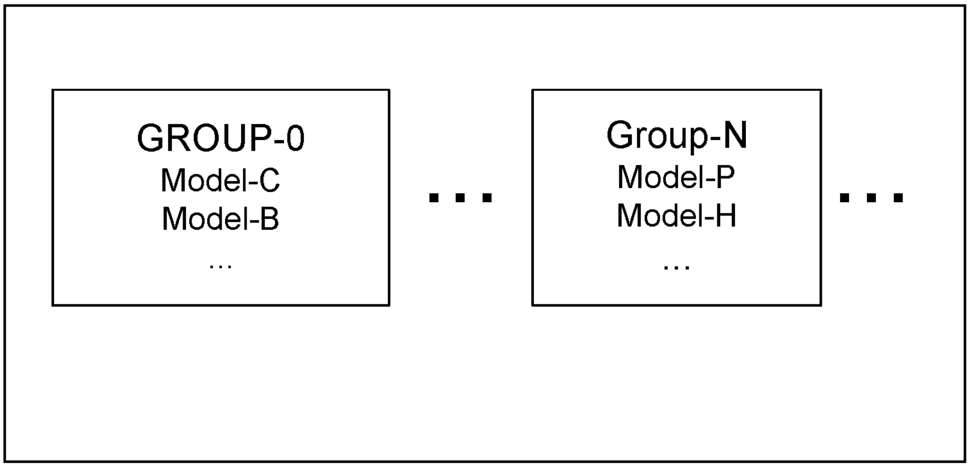
FIG. 7 is a block diagram illustrating model function-based grouping, in accordance with various aspects of the present disclosure.

FIG. 7 is a block diagram illustrating model function-based grouping, in accordance with various aspects of the present disclosure. For example, Group-0 might only include some basic machine learning models to support basic functions, such as handling CSF (e.g., Model-C), beam management (e.g., Model-B), decoding, and/or channel estimation. Other machine learning groups, such as through Group-N and beyond, may include machine learning models for other functions that may be more advanced, such as positioning (e.g., Model-P), handover (e.g., Model-H), handling interference, and/or channel sensing. Other machine learning groups may include other advanced functions. There may be other rules for machine learning model grouping.

Models may be categorized into different groups, for example, with standardization or with radio resource control (RRC) signaling. Switching between model groups may be based on RRC signaling, media access control (MAC) control elements (MAC-CEs), and/or downlink control information (DCI) in a physical downlink control channel (PDCCH). RRC signaling or MAC-CE-based solutions may not always be flexible or quick enough to trigger the switching actions. Although DCI can provide a fast and flexible configuration, limited resources exist in the DCI for the model group switching.

The PDCCH may configure model group switching. A machine learning group switching field may be defined in PDCCH downlink control information (DCI). The field may indicate the machine learning group switching, and may also be extended to include other information such as model activating and deactivating. In addition to the DCI indication, group switching might be configured by a MAC-CE or radio resource control (RRC) signaling. For example, a UE may access a new cell and dynamically switch to the corresponding group.

The UE monitors the PDCCH field to check the machine learning configuration. Generally, the UE is configured with multiple groups to adapt to different conditions and thus monitors for each of the groups. Moreover, the network (e.g., machine learning manager) may periodically enable group switching or a model update. The UE monitors the model configuration updates to adapt to different environments or conditions. The model adaptation procedure, however, involves a large signaling cost. According to aspects of the present disclosure, skipping of monitoring occasions and/or introducing sparse occasion patterns may be used to reduce the configuration resource cost, while maintaining flexibility and performance.

In some aspects, the network explicitly signals which model groups should be skipped for monitoring of model group switching commands. Signaling may be configured to deactivate or activate monitoring for one or more model groups. In some aspects, monitoring for some model groups may be disabled for a certain duration.

Figure 8:
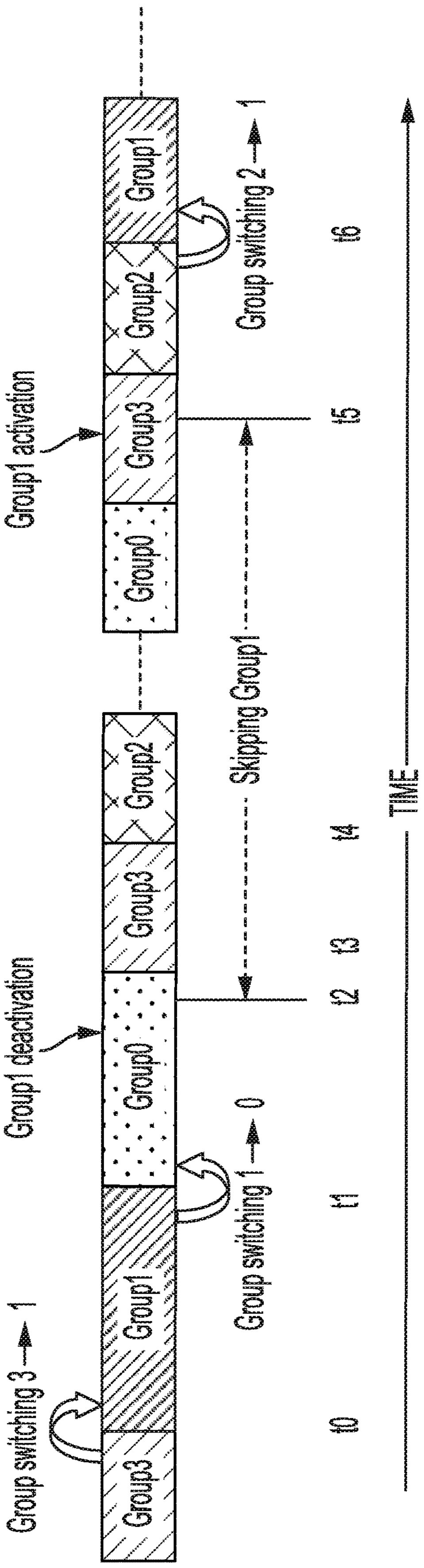
FIG. 8 is a block diagram illustrating skipping of monitoring occasions for a machine learning model group, in accordance with various aspects of the present disclosure.

FIG. 8 is a block diagram illustrating skipping of monitoring occasions for a machine learning model group, in accordance with various aspects of the present disclosure. In the example of FIG. 8, there are four groups: group zero, group one, group two, and group three. The different groups are enabled with group switching to adapt to the varying conditions. At time to, the UE switches monitoring for group three to monitoring for group one. At time t1, the UE switches from group one to group zero. At time t2, according to aspects of the present disclosure, the network signals to deactivate monitoring for model group one. At time t3, the UE switches to group three, and at time t4, the UE switches to monitor for another group, other than group one. At time t5, the UE receives a message activating group one. Thus, between times t2 and t5, the UE does not monitor for commands related to model group one, but is able to again switch to group one after receiving the activating message at time t5. At time t6, the UE switches from group two to group one, because group one was activated again at time t5.

According to aspects of the present disclosure, signaling for skipping explicit model groups may occur as part of a procedure. The procedure includes configuring a model group list via radio resource control (RRC) signaling. The UE may receive a model group switching indication in downlink control information. The model group activation or deactivation might be defined in RRC signaling, a MAC-CE, or downlink control information. Generally, the activation or deactivation is a static and low-frequency configuration.

As a result of explicit signaling for skipping model groups, unnecessary model group switching actions may be avoided. For example, while a UE is in a cell with low mobility, and/or during the night (e.g., while the user is sleeping), most functions are disabled, or discontinuous reception (DRX) is enabled. In this case, except for the base model group, the other model groups may be deactivated for a long duration.

In some aspects, the activation or deactivation signaling may be embedded within a procedure to access a new cell (e.g., handover event). In other aspects, the activation or deactivation signaling may be embedded with a user equipment mode. For example, with a low battery condition, many of the model groups may be disabled. In each of these procedures, there may be explicit signaling indicating which model groups should be activated or deactivated.

In other aspects of the present disclosure, sparse occasion patterns may be introduced. As described above, the UE may always monitor for model configurations in the configured occasions. If the pattern of monitoring occasions is a dense pattern, the UE consumes a significant amount of power.

Different model groups may specify a particular monitoring pattern. In some aspects, separate signaling configures the monitoring pattern. The signaling may be defined in a general machine learning configuration, not associated with any specific models or group. For example, when a UE is synchronized with the machine learning node (e.g., machine learning manager), the monitoring pattern may be configured. The signaling may also be associated to a UE type or working mode. For example, after the UE machine learning capability reporting, a low-tier UE is configured with a low monitoring pattern. As another example, when a UE working in discontinuous reception (DRX) idle mode, the UE may be configured with a low density for model monitoring.

In other aspects, a specific monitoring pattern is embedded into a model group configuration. In these aspects, a specific monitoring pattern is included in the model group configuration. When switching to one model group, the corresponding monitoring pattern is enabled. In some aspects, when multiple different patterns are simultaneously configured, a densest pattern is enabled. For example, if a UE is configured with multiple model groups simultaneously, each with a different pattern, only the densest pattern is enabled. To embed the monitoring pattern with the model configuration, the model group configuration may include a model number of the model group, and a monitoring pattern, along with other parameters.

In still other aspects, an anchor-based model pattern configuration is used, where one anchor model group set is configured. In these aspects, the set may include multiple model groups. When the UE operates with the anchor model group set, the anchor monitoring pattern is configured. For example, the monitoring pattern for the anchor model group set may be a sparse occasion pattern. When the UE switches to another group, another monitoring pattern is enabled. In some aspects, the anchor model group set is assigned to the group of models the UE operates with most frequently. Thus, the UE does not often need to be configured with a monitoring pattern.

Figure 9:
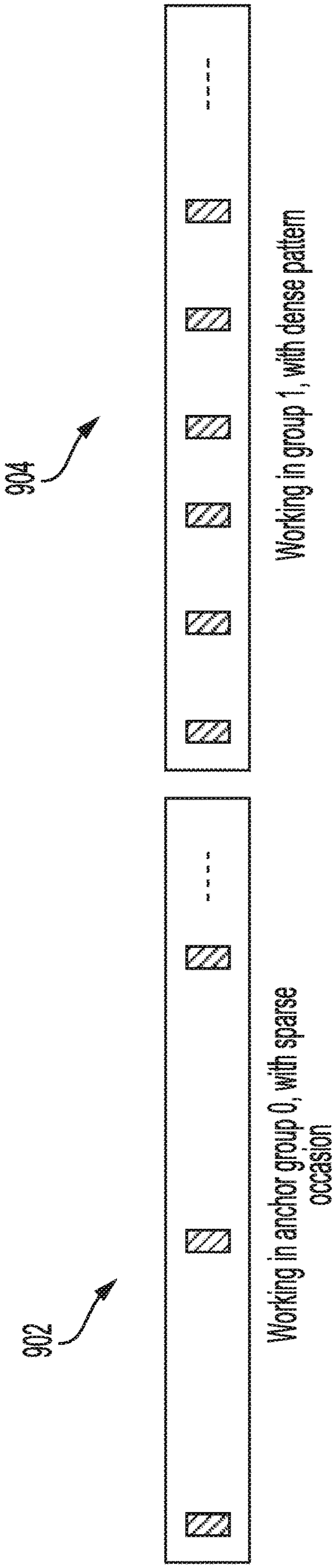
FIG. 9 is a block diagram illustrating sparse and dense monitoring occasion patterns for machine learning model groups, in accordance with various aspects of the present disclosure.

FIG. 9 is a block diagram illustrating sparse and dense monitoring occasion patterns for machine learning model groups, in accordance with various aspects of the present disclosure. In the example according to FIG. 9, group zero is assigned as an anchor model group set. When the UE is operating with group zero, the machine learning model monitoring is configured with a sparse pattern 902. In this example, group two is also part of the anchor model group set. The system only checks whether group two is in the anchor model group set to determine the monitoring pattern. If the model being used by the UE is part of the anchor model group set, the UE does not need a new monitoring pattern. When the UE is working in another group (e.g., group one, which is not part of the anchor model set), the UE is configured for monitoring with a dense pattern 904.

In some aspects of the present disclosure, the monitoring pattern is a subset of a reference pattern configuration. For these subset configurations, a base monitoring pattern is defined. For each pattern configuration, only one subset is configured. For example, the subset configuration may modify the monitoring periodicity (density ratio) and the monitoring starting point.

Figure 10:
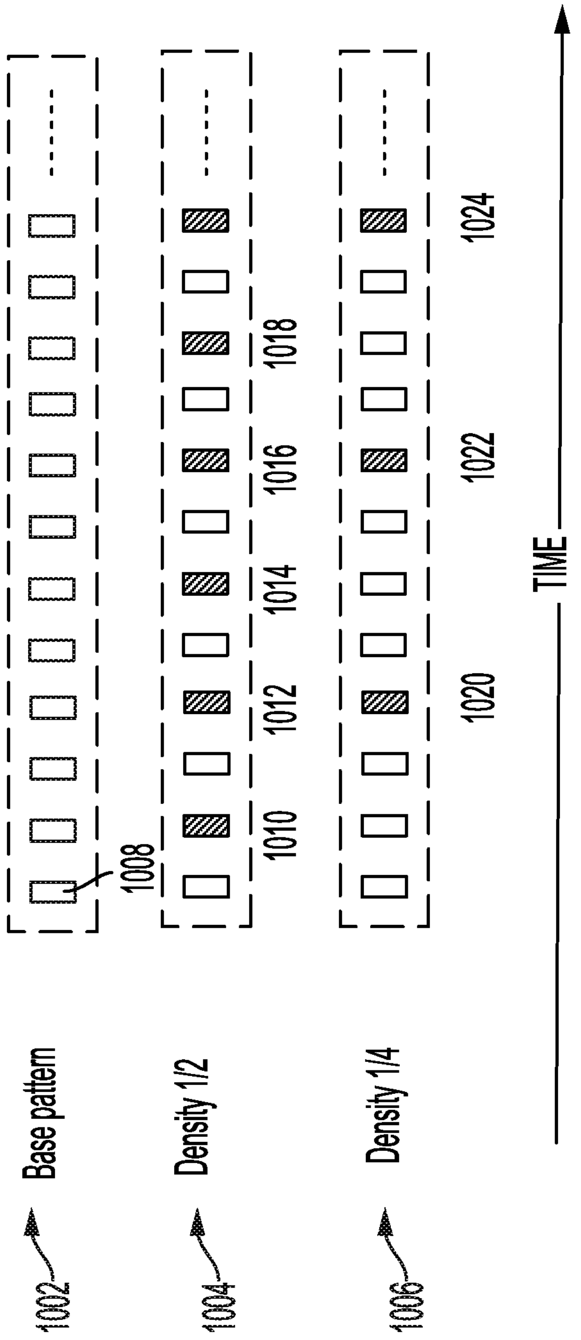
FIG. 10 is a block diagram illustrating base and subset monitoring occasion patterns for machine learning model groups, in accordance with various aspects of the present disclosure.

FIG. 10 is a block diagram illustrating base and subset monitoring occasion patterns for machine learning model groups, in accordance with various aspects of the present disclosure. In the example of FIG. 10, a base pattern 1002 is defined with multiple monitoring occasions 1008. For brevity, the example of FIG. 10 only includes one label for an occasion 1008 of the base pattern 1002. A pattern 1004 for model group one has a density of one-half the density of the base pattern 1002. Therefore, based on the one-half density of the base pattern 1002, when the UE is working in group one, the occasions 1010, 1012, 1014, 1016, 1018 monitored for group one are half of the occasions 1008 of group one. Additionally, a pattern 1006 for model group two has a density of one-fourth the density of the base pattern 1002. Therefore, based on the one-fourth density of the base pattern 1002, when the UE is switched to group two, the occasions 1020, 1022, 1024 monitored for group two are one quarter of the occasions 1026 of group one.

Figure 11:
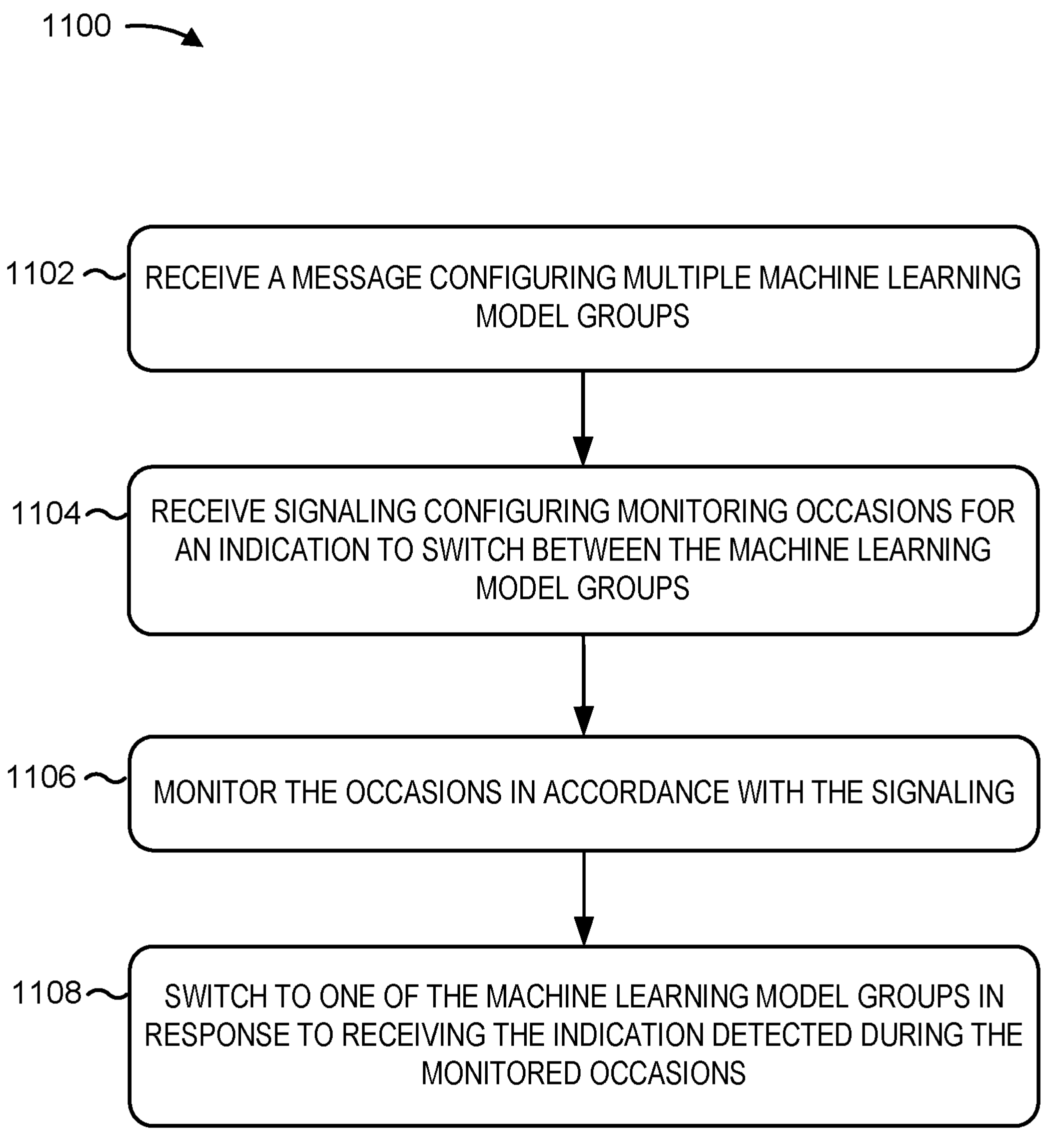
FIG. 11 is a flow diagram illustrating an example process performed, for example, by a user equipment (UE), in accordance with various aspects of the present disclosure.

FIG. 11 is a flow diagram illustrating an example process 1100 performed, for example, by a user equipment (UE), in accordance with various aspects of the present disclosure. The example process 1100 is an example of reducing monitoring of messages that indicate machine learning (ML) model group switching. The operations of the process 1100 may be implemented by a UE 120.

At block 1102, the UE receives a message configuring multiple machine learning model groups. For example, the UE (e.g., using the antenna 252, DEMOD/MOD 254, MIMO detector 256, receive processor 258, controller/processor 280, and/or memory 282) may receive the message configuring the multiple machine learning model groups. The multiple machine learning model groups may be specified for different application functions. The machine learning models may be different versions for the same application function. In some aspects, the message is received via RRC signaling.

At block 1104, the UE receives signaling configuring monitoring occasions for an indication to switch between the machine learning model groups. For example, the UE (e.g., using the antenna 252, DEMOD/MOD 254, MIMO detector 256, receive processor 258, controller/processor 280, and/or memory 282) may receive the signaling configuring the monitoring occasions. The UE may receive the model group switching indication in downlink control information. The model group activation or deactivation might be defined in RRC signaling, a MAC-CE, or downlink control information. Signaling may be configured to deactivate or activate monitoring for one or more model groups. In some aspects, monitoring for some model groups may be disabled for a certain duration.

At block 1106, the UE monitors the occasions in accordance with the signaling. For example, the UE (e.g., using the controller/processor 280, and/or memory 282) may monitor the occasions in accordance with the signaling. According to aspects of the present disclosure, skipping of monitoring occasions and/or introducing sparse occasion patterns may be used to reduce the configuration resource cost, while maintaining flexibility and performance.

At block 1108, the UE switches to one of the machine learning model groups in response to receiving the indication detected during the monitored occasions. For example, the UE (e.g., using the controller/processor 280, and/or memory 282) may switch machine learning model groups in response to receiving the indication. In some aspects, when the UE switches to another group, another monitoring pattern is enabled. In some aspects, an anchor model group set is assigned to the group of models the UE operates with most frequently. Thus, the UE does not often need to be configured with a monitoring pattern.

Figure 12:
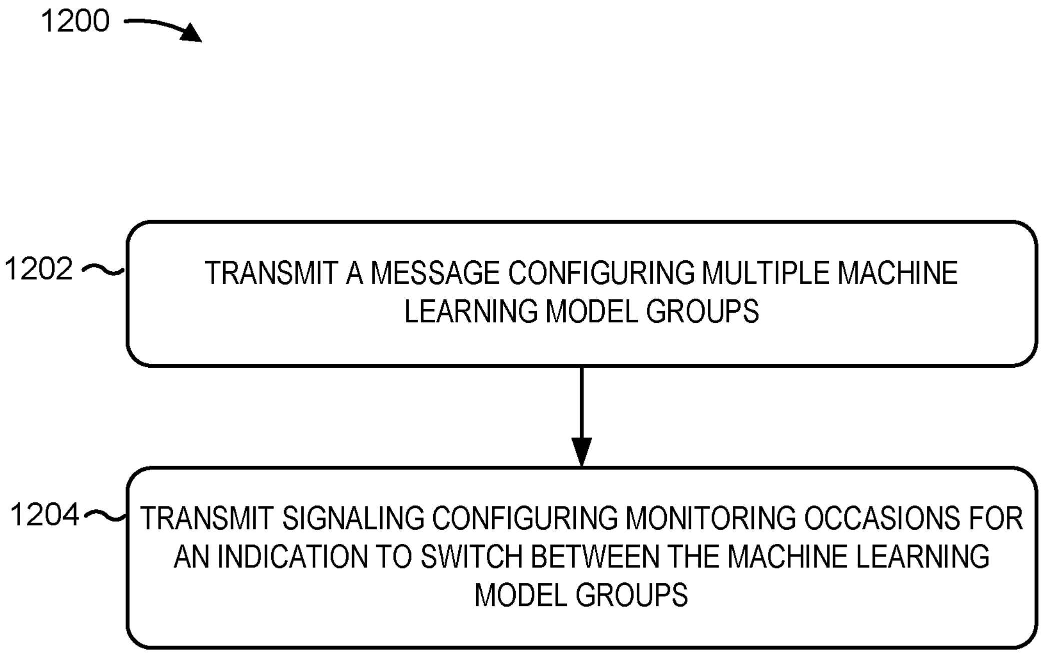
FIG. 12 is a flow diagram illustrating an example process performed, for example, by a base station, in accordance with various aspects of the present disclosure.

FIG. 12 is a flow diagram illustrating an example process 1200 performed, for example, by a base station, in accordance with various aspects of the present disclosure. The example process 1200 is an example of a method for reducing monitoring of messages that indicate machine learning (ML) model group switching. The operations of the process 1200 may be implemented by a base station 110.

At block 1202, the base station may transmit a message configuring multiple machine learning model groups. For example, the base station (e.g., using the antenna 234, MOD/DEMOD 232, TX MIMO processor 230, transmit processor 220, controller/processor 240, and/or memory 242) may transmit the configuration message. In some aspects, the message is transmitted via RRC signaling.

At block 1204, the base station may transmit signaling configuring monitoring occasions for an indication to switch between the multiple machine learning model groups. For example, the base station (e.g., using the antenna 234, MOD/DEMOD 232, TX MIMO processor 230, transmit processor 220, controller/processor 240, and/or memory 242) may transmit the signaling configuring monitoring occasions. In some aspects, the signaling configuring monitoring occasions deactivates or actives monitoring for at least one of the machine learning model groups. In other aspects, the signaling configuring monitoring occasions is transmitted via radio resource control (RRC) signaling, a media access control-control element (MAC-CE), or a downlink control information (DCI) message. In still other aspects, the signaling configuring monitoring occasions is part of a handover procedure. In further aspects, the signaling configuring monitoring occasions is based on a mode of the UE or a type of the UE. In some aspects, the signaling configuring monitoring occasions is transmitted as part of a general machine learning configuration, not associated with any of the machine learning groups. The signaling configuring monitoring occasions may be transmitted based on a mode of the UE or a type of the UE

Example Aspects

Aspect 1: A method of wireless communication by a user equipment (UE), comprising: receiving a message configuring a plurality of machine learning model groups; receiving signaling configuring monitoring occasions for an indication to switch between the plurality of machine learning model groups; monitoring the occasions in accordance with the signaling; and switching to one of the plurality of machine learning model groups in response to receiving the indication detected during the monitored occasions.

Aspect 2: The method of Aspect 1, in which the signaling deactivates or activates monitoring for at least one of the plurality of machine learning model groups.

Aspect 3: The method of Aspect 1 or 2, in which the signaling configuring the monitoring occasions is received via radio resource control (RRC) signaling, a media access control-control element (MAC-CE) or a downlink control information (DCI) message.

Aspect 4: The method of any of the preceding Aspects, in which the signaling is part of a handover procedure.

Aspect 5: The method of any of the preceding Aspects, in which the signaling is based on a mode of the UE or a type of the UE.

Aspect 6: The method of any of the preceding Aspects, in which the signaling is received in a general machine learning configuration, not associated with any of the plurality of machine learning model groups.

Aspect 7: The method of any of the preceding Aspects, in which the signaling is received based on a mode of the UE or a type of the UE.

Aspect 8: The method of any of the preceding Aspects, in which the message configuring the plurality of machine learning model groups includes the signaling configuring the monitoring occasions.

Aspect 9: The method of any of the preceding Aspects, further comprising selecting a densest monitoring pattern in response to receiving the signaling configuring the monitoring occasions for the plurality of machine learning model groups includes a plurality of monitoring patterns.

Aspect 10: The method of any of the preceding Aspects, in which the signaling configuring the monitoring occasions indicates a subset of an anchor monitoring pattern associated with an anchor machine learning group, the subset corresponding to one of the plurality of machine learning model groups, the method further comprising: monitoring in accordance with the anchor monitoring pattern in response to the UE operating with the anchor machine learning group; and monitoring in accordance with the subset in response to the UE switching to the one of the plurality of machine learning model groups.

Aspect 11: The method of any of the preceding Aspects, in which the subset comprises a periodicity and an offset.

Aspect 12: A method of wireless communication by a base station, comprising: transmitting, to a user equipment (UE), a message configuring a plurality of machine learning model groups; and transmitting, to the UE, signaling configuring the monitoring occasions for an indication to switch between the plurality of machine learning model groups.

Aspect 13: The method of Aspect 12, in which the signaling configuring the monitoring occasions deactivates or actives monitoring for at least one of the plurality of machine learning model groups.

Aspect 14: The method of Aspect 12 or 13, in which the signaling configuring the monitoring occasions is transmitted via radio resource control (RRC) signaling, a media access control-control element (MAC-CE) or a downlink control information (DCI) message.

Aspect 15: The method of any of the aspects 12-14, in which the signaling configuring the monitoring occasions is part of a handover procedure.

Aspect 16: The method of any of the aspects 12-15, in which the signaling configuring monitoring occasions is based on a mode of the UE or a type of the UE.

Aspect 17: The method of any of the aspects 12-16, in which the signaling configuring monitoring occasions is transmitted as part of a general machine learning configuration, not associated with any of the plurality of machine learning model groups.

Aspect 18: The method of any of the aspects 12-17, in which the signaling configuring the monitoring occasions is transmitted based on a mode of the UE or a type of the UE.

Aspect 19: The method of any of the aspects 12-18, in which the message configuring the plurality of machine learning model groups includes the signaling configuring the monitoring occasions.

Aspect 20: The method of any of the aspects 12-19, in which the signaling configuring the monitoring occasions indicates a subset of an anchor monitoring pattern associated with an anchor machine learning group, the subset corresponding to one of the plurality of machine learning model groups.

Aspect 21: The method of any of the aspects 12-20, in which the subset comprises a periodicity and an offset.

Aspect 22: An apparatus for wireless communication by a user equipment (UE), comprising: a memory; and at least one processor coupled to the memory and configured: to receive a message configuring a plurality of machine learning model groups; to receive signaling configuring the monitoring occasions for an indication to switch between the plurality of machine learning model groups; to monitor the occasions in accordance with the signaling; and to switch to one of the plurality of machine learning model groups in response to receiving the indication detected during the monitored occasions.

Aspect 23: The apparatus of Aspect 22, in which the signaling configuring the monitoring occasions deactivates or actives monitoring for at least one of the plurality of machine learning model groups.

Aspect 24: The apparatus of Aspect 22 or 23, in which the signaling configuring the monitoring occasions is received via radio resource control (RRC) signaling, a media access control-control element (MAC-CE) or a downlink control information (DCI) message.

Aspect 25: The apparatus of any of the aspects 22-24, in which the signaling configuring the monitoring occasions is received in a general machine learning configuration, not associated with any of the plurality of machine learning model groups.

Aspect 26: The apparatus of any of the aspects 22-25, in which the signaling configuring the monitoring occasions is received based on a mode of the UE or a type of the UE.

Aspect 27: The apparatus of any of the aspects 22-26, in which the message configuring the plurality of machine learning model groups includes the signaling configuring the monitoring occasions.

Aspect 28: The apparatus of any of the aspects 22-27, in which the at least one processor is further configured to select a densest monitoring pattern in response to receiving the signaling configuring the monitoring occasions for the plurality of machine learning model groups with a plurality of different monitoring patterns.

Aspect 29: The apparatus of any of the aspects 22-28, in which the signaling configuring the monitoring occasions indicates a subset of an anchor monitoring pattern associated with an anchor machine learning group, the subset corresponding to one of the plurality of machine learning model groups, the at least one processor further configured: to monitor in accordance with the anchor monitoring pattern in response to the UE operating with the anchor machine learning group; and to monitor in accordance with the subset in response to the UE switching to the one of the plurality of machine learning model groups.

Aspect 30: The apparatus of any of the aspects 22-29, in which the subset comprises a periodicity and an offset.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:

- receiving a message configuring a plurality of machine learning model groups;
- receiving signaling configuring monitoring occasions, indicating times during which the UE is to monitor for an indication to switch between the plurality of machine learning model groups;
- monitoring the occasions in accordance with the signaling; and
- switching to one of the plurality of machine learning model groups in response to receiving the indication detected during the monitored occasions.

2. The method of claim 1, in which the signaling deactivates or activates monitoring for at least one of the plurality of machine learning model groups.

3. The method of claim 2, in which the signaling configuring the monitoring occasions is received via radio resource control (RRC) signaling, a media access control-control element (MAC-CE), or a downlink control information (DCI) message.

4. The method of claim 3, in which the signaling is part of a handover procedure.

5. The method of claim 3, in which the signaling is based on a mode of the UE or a type of the UE.

6. The method of claim 1, in which the signaling is received in a general machine learning configuration, not associated with any of the plurality of machine learning model groups.

7. The method of claim 1, in which the signaling is received based on a mode of the UE or a type of the UE.

8. The method of claim 1, in which the message configuring the plurality of machine learning model groups includes the signaling configuring the monitoring occasions.

9. The method of claim 8, further comprising selecting a densest monitoring pattern in response to receiving the signaling configuring the monitoring occasions for the plurality of machine learning model groups includes a plurality of monitoring patterns.

10. The method of claim 1, in which the signaling configuring the monitoring occasions indicates a subset of an anchor monitoring pattern associated with an anchor machine learning group, the subset corresponding to one of the plurality of machine learning model groups, the method further comprising:

- monitoring in accordance with the anchor monitoring pattern in response to the UE operating with the anchor machine learning group; and
- monitoring in accordance with the subset in response to the UE switching to the one of the plurality of machine learning model groups.

11. The method of claim 10, in which the subset comprises a periodicity and an offset.

12. A method of wireless communication by a base station, comprising:

- transmitting, to a user equipment (UE), a message configuring a plurality of machine learning model groups; and
- transmitting, to the UE, signaling configuring monitoring occasions, indicating times during which the UE is to monitor for an indication to switch between the plurality of machine learning model groups.

13. The method of claim 12, in which the signaling configuring the monitoring occasions deactivates or activates monitoring for at least one of the plurality of machine learning model groups.

14. The method of claim 13, in which the signaling configuring the monitoring occasions is transmitted via radio resource control (RRC) signaling, a media access control-control element (MAC-CE), or a downlink control information (DCI) message.

15. The method of claim 14, in which the signaling configuring the monitoring occasions is part of a handover procedure.

16. The method of claim 14, in which the signaling configuring the monitoring occasions is based on a mode of the UE or a type of the UE.

17. The method of claim 12, in which the signaling configuring the monitoring occasions is transmitted as part of a general machine learning configuration, not associated with any of the plurality of machine learning model groups.

18. The method of claim 12, in which the signaling configuring the monitoring occasions is transmitted based on a mode of the UE or a type of the UE.

19. The method of claim 12, in which the message configuring the plurality of machine learning model groups includes the signaling configuring the monitoring occasions.

20. The method of claim 12, in which the signaling configuring the monitoring occasions indicates a subset of an anchor monitoring pattern associated with an anchor machine learning group, the subset corresponding to one of the plurality of machine learning model groups.

21. The method of claim 20, in which the subset comprises a periodicity and an offset.

22. An apparatus for wireless communication by a user equipment (UE), comprising:

a memory; and at least one processor coupled to the memory and configured:

to receive a message configuring a plurality of machine learning model groups;

to receive signaling configuring monitoring occasions, indicating times during which the UE is to monitor for an indication to switch between the plurality of machine learning model groups;

to monitor the occasions in accordance with the signaling; and to switch to one of the plurality of machine learning model groups in response to receiving the indication detected during the monitored occasions.

23. The apparatus of claim 22, in which the signaling configuring the monitoring occasions deactivates or activates monitoring for at least one of the plurality of machine learning model groups.

24. The apparatus of claim 23, in which the signaling configuring the monitoring occasions is received via radio resource control (RRC) signaling, a media access control-control element (MAC-CE), or a downlink control information (DCI) message.

25. The apparatus of claim 22, in which the signaling configuring the monitoring occasions is received in a general machine learning configuration, not associated with any of the plurality of machine learning model groups.

26. The apparatus of claim 22, in which the signaling configuring the monitoring occasions is received based on a mode of the UE or a type of the UE.

27. The apparatus of claim 22, in which the message configuring the plurality of machine learning model groups includes the signaling configuring the monitoring occasions.

28. The apparatus of claim 27, in which the at least one processor is further configured to select a densest monitoring pattern in response to receiving the signaling configuring the monitoring occasions for the plurality of machine learning model groups with a plurality of different monitoring patterns.

29. The apparatus of claim 22, in which the signaling configuring the monitoring occasions indicates a subset of an anchor monitoring pattern associated with an anchor machine learning group, the subset corresponding to one of the plurality of machine learning model groups, the at least one processor further configured:

to monitor in accordance with the anchor monitoring pattern in response to the UE operating with the anchor machine learning group; and to monitor in accordance with the subset in response to the UE switching to the one of the plurality of machine learning model groups.

30. The apparatus of claim 29, in which the subset comprises a periodicity and an offset.

* * * * *